United States Patent
Yamanashi

[11] Patent Number: 5,159,494
[45] Date of Patent: Oct. 27, 1992

[54] ZOOM LENS SYSTEM
[75] Inventor: Takanori Yamanashi, Kokubunji, Japan
[73] Assignee: Olympus Optical Co., Ltd., Tokyo, Japan
[21] Appl. No.: 544,958
[22] Filed: Jun. 28, 1990
[30] Foreign Application Priority Data
  Jun. 29, 1989 [JP] Japan .................. 1-165442
[51] Int. Cl.$^5$ .............................. G02B 15/00
[52] U.S. Cl. .................... 359/689; 359/693; 359/705
[58] Field of Search ............ 350/423, 477, 427, 428; 359/683-690, 676, 677, 791, 693, 695, 705

[56] References Cited
U.S. PATENT DOCUMENTS

| | | | |
|---|---|---|---|
| 4,178,076 | 12/1979 | Tsuji et al. | 359/693 |
| 4,256,371 | 3/1981 | Someya | 359/700 |
| 4,711,534 | 12/1987 | Matsushita et al. | 359/680 |
| 4,726,668 | 2/1988 | Nakayama et al. | 350/477 |
| 4,830,477 | 5/1989 | Takahashi et al. | 359/686 |
| 4,840,467 | 6/1989 | Takada et al. | 350/427 |
| 4,848,883 | 7/1989 | Maruyama | 359/687 |
| 4,865,434 | 9/1989 | Matsushita et al. | 359/690 |

FOREIGN PATENT DOCUMENTS

| | | | |
|---|---|---|---|
| 3133022 | 5/1982 | Fed. Rep. of Germany | 350/428 |
| 63-43115 | 2/1988 | Japan | |
| 63-153511 | 6/1988 | Japan | |

Primary Examiner—Bruce Y. Arnold
Assistant Examiner—James Phan
Attorney, Agent, or Firm—Cushman, Darby & Cushman

[57] ABSTRACT

The present invention provides a zoom lens system comprising, in the order from the object side, a first lens unit having positive refractive power, a second lens unit having positive refractive power and a third lens unit having negative refractive power, and adapted so as to perform zooming by varying the airspaces reserved between the lens units and permit photographing at an expanded tele position providing a focal length longer than that of the zoom lens system as a whole at the tele position by setting the airspace reserved between the second lens unit and the third lens unit at a width smaller than that at the tele position.

4 Claims, 9 Drawing Sheets

ZOOM LENS SYSTEM

BACKGROUND OF THE INVENTION

1. Field of the Invention

The present invention relates to a zoom lens system having a vari-focal function, in addition to the ability to zoom from a wide position to a tele position, that enables the present invention to set, at a position exceeding the tele position and discontinuous therefrom, at least one focal length or a lateral magnification longer than the focal length or higher than the lateral magnification at the tele position, respectively, so that photography is permitted at the focal length or the lateral magnification at the position exceeding the tele position.

2. Description of the Prior Art

In the recent year where cameras are fully automated, it is generally practised to widen photographing ranges by adopting zoom lens systems in the so-called lens shutter cameras which are portable in spite of the multiple functions imparted thereto In order to widen photographing ranges, it is necessary to develop a compact zoom lens system which can be built as a photographing optical system into camera systems.

Further, such a photographing optical system can have a short back focal length since it is unnecessary to reserve a space for arranging a quick return mirror in the photographing optical system unlike the optical systems to be used in the so-called single reflex cameras.

On the other hand, shortening total length of the photographing optical system over the entire zooming range from the wide position to the tele position thereof is conflicting in designing with enhancement of varifocal ratio thereof.

Zoom lens systems have high vari-focal ratios in the recent trend and there are known numerous compact zoom lens systems each of which has a high vari-focal ratio and consists of two lens units, i.e., a front lens unit having positive refractive power and a rear lens unit having negative refractive power. The zoom lens systems of this type have simple compositions and are used widely in practice. However, the zoom lens systems have a common defect that they cannot have large aperture ratios, though vari-focal ratios of the lens systems can be enhanced to an order of 2.

In order to correct this defect, there have been developed, as zoom lens systems having high varifocal ratios and high performance, the zoom lens systems disclosed by Japanese Patent Kokai Publication No. 63-43115 and Japanese Patent Kokai Publication No. 63-153511. However, it cannot be said that these zoom lens system have sufficiently high vari-focal ratios.

Furthermore, in order to further widen varifocal ranges, there have been developed the zoom lens systems which are adapted so as to permit photographing at focal lengths other than the focal lengths within the normal continuous vari-focal ranges. Most of these zoom lens systems are designed so as to permit arranging an additional vari-focal lens unit on the image side of a main lens system (a zoom lens system) or an afocal conversion lens on the object side of the main lens system.

These zoom lens systems are not preferable for practical use from the viewpoints of compactness of cameras and integral design with cameras.

As is understood from the foregoing description, the conventional zoom lens systems for compact cameras are insufficient in the vari-focal ratios thereof and inadequate from viewpoints of practical use such as integral design with cameras.

SUMMARY OF THE INVENTION

A primary object of the present invention is to provide a zoom lens system which permits photographing at a focal length obtained at a position exceeding the tele position thereof (expanded tele position) in addition to photographing within a range of continuously variable focal lengths from the wide position to the tele position.

The zoom lens system according to the present invention comprises, in the order from the object side, a first lens unit having positive refractive power, a second lens unit having positive refractive power and a third lens unit having negative refractive power, and is adapted so as to perform zooming from the wide position to the tele position by varying the airspaces reserved between the lens units. Further, the zoom lens system according to the present invention is adapted so as to permit zooming to the expanded tele position at which the zoom lens system has a focal length longer than that at the tele position thereof by varying the air-space reserved between the second lens unit and the third lens unit to a width smaller than that at the tele position of the zoom lens system.

Figure 1:
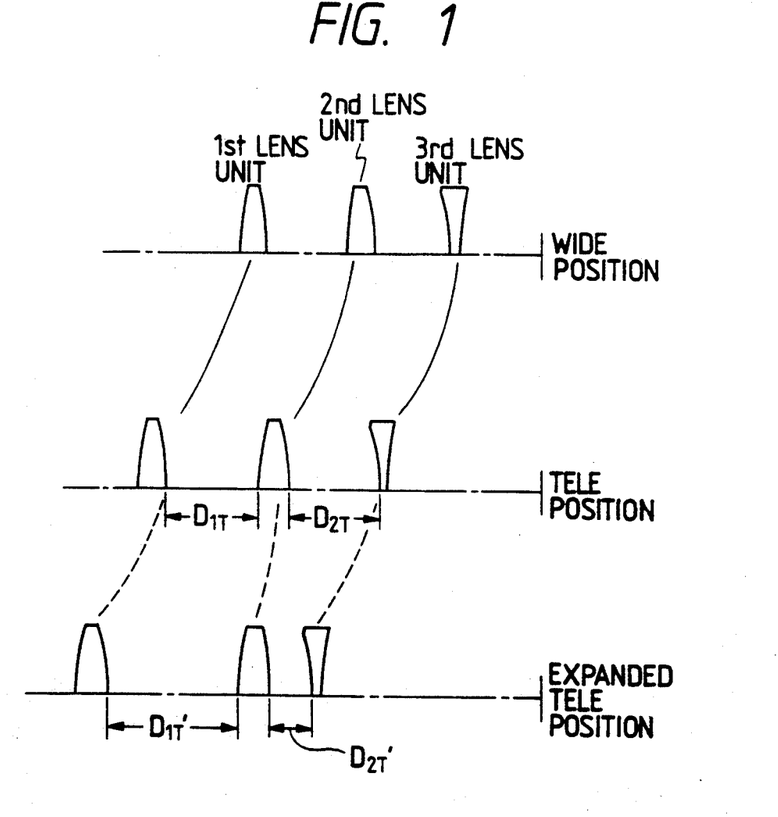
FIG. 1 shows a diagram illustrating the principle of variation of focal length of the zoom lens system according to the present invention.

The fundamental principle of the zoom lens system according to the present invention is visualized in FIG. 1, wherein the solid lines, out of the moving loci of the first positive lens unit I, the second positive lens unit II and the third negative lens unit III, indicate the ordinary moving loci of the lens units for zooming the lens system from the wide position to the tele position. That is to say, the solid lines indicate the ordinary zooming range of the zoom lens system wherein focal length of the lens system is varied continuously. Further, the lens units are moved as indicated by the dashed lines for changing focal length of the zoom lens system to that the expanded tele position. The loci indicated by the dashed lines are determined non-linealy for moving the respective lens units so as to maintain a definite image quality and prevent total length of the zoom lens system from being prolonged.

The focal length at the tele position of the zoom lens system composed of the three lens units described above is expressed by the following formula:

$$f_T = f_1 \cdot \beta_{2T} \cdot \beta_{3T}$$

wherein the reference symbol $f_T$ represents the focal length of the zoom lens system as a whole at the tele position thereof, and the reference symbols $\beta_{2T}$ and $\beta_{3T}$ designate the lateral magnifications of the second lens units, the third lens unit respectively at the tele position and the reference symbol $f_1$ denotes the focal length of the first lens unit.

Further, the focal length at the expanded tele position of the zoom lens system which is longer than that at the tele position is expressed by the following formula:

$$f_T' = f_1 \cdot \beta_{2T}' \cdot \beta_{3T}'$$

wherein the reference symbol $f_T'$ represents the focal length of the zoom lens system at the expanded tele position thereof, and the reference symbols $\beta_{2T}'$ and $\beta_{3T}'$ designate the lateral magnifications of the second lens unit and the third lens unit respectively at the expanded tele position.

Since $f_T'$ is longer than $f_T'$ there establishes the following relationship:

$$f_1 \cdot \beta_{2T'} \cdot \beta_{3T'} > f_1 \cdot \beta_{2T} \cdot \beta_{3T}$$

In a zoom lens system having such a composition as that of the lens system according to the present invention, the third lens unit has the main vari-focal function. Therefore, in order to obtain a focal length of the zoom lens system which is longer than that at the tele position, there must establish the following relationship:

$$\beta_{3T'} > \beta_{3T}$$

In order to design the zoom lens system composed of the three lens units described above so as to permit photographing at the expanded tele position which is expanded from the tele position of the zooming range wherein focal length is variable continuously from the wide position to the tele position, it is necessary to enhance the magnification of the third lens unit used as the vari-focal lens unit. In other words, it is necessary to satisfy the following relationship:

$$|\beta_{3T'}| > |\beta_{3T}|$$

In order to enhance magnification of the third lens unit to a level satisfying the above-mentioned relationship, it is necessary to narrow the airspace reserved between the second lens unit and the third lens unit. Accordingly, the airspace $D_T'$ reserved between the second lens unit and the third lens unit at the expanded tele position at which the zoom lens system has a focal length longer than that at the tele position must be narrower than the airspace $D_{2T}$ between the second lens unit and the third lens unit at the tele position. That is to say, the zoom lens system must satisfy the following relationship:

$$D_{2T} > D_{2T'}$$

When the zooming range of the lens system is expanded so as to provide the expanded tele position as described above, aberrations are varied, thereby degrading imaging performance of the zoom lens system. In order to make the zoom lens system usable even at the expanded tele position, it is necessary to correct the varied aberrations.

In the zoom lens system according to the present invention, aberrations are corrected by reserving an airspace between the first lens unit and the second lens unit at the expanded tele position which is wider than the airspace between these lens unit at the tele position. Speaking concretely, in order to obtain favorable imaging performance of the zoom lens system even at the expanded tele position, it is desirable that the lens system satisfies the following relationship:

$$D_{1T'} > D_{1T}$$

Since magnification of the third lens unit is lowered when $D_{2T}$ is narrower than $D_{2T'}$ as described above, this relationship is contrary to the object of the present invention. Further, the relationship of $D_{1T'} < D_{1T}$ is undesirable since this relationship aggravates aberrations, especially spherical aberration, or enlarge absolute value thereof when focal length of the zoom lens system is prolonged.

Furthermore, relationship of $|\beta_{3T'}| < |\beta_{3T}|$ does not allow magnification of the third lens unit to be enhanced at the expanded tele position and is contrary to the object of the present invention.

Figure 2:
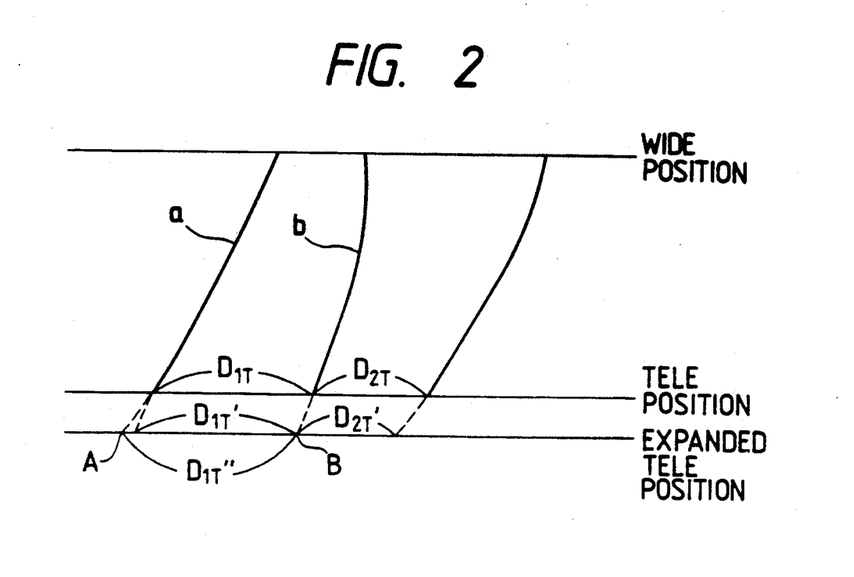
FIG. 2 shows a diagram illustrating the moving loci of the lens units of the zoom lens system according to the present invention.

When the lens system is zoomed from the tele position to the expanded tele position as described above, it is desirable for more favorable correction of aberrations to impose the restriction described below on the airspace $D_{1T'}$ reserved between the first lens unit and the second lens unit at the expanded tele position. Speaking concretely, it is desirable that the following condition is satisfied:

$$D_{1T'} < D_{1T''}$$

wherein the reference symbol $D_{1T''}$ represents the airspace reserved between the points A and B which are determined by extending the moving loci a and b of the first lens unit and the second lens unit respectively from the wide position to the tele position as illustrated in FIG. 2.

By designing the zoom lens system so as to satisfy this condition it is possible to improve image quality at the center of the image surface. In other words, by enhancing height of incidence of the axial ray on the second lens unit so as to produce aberrations having the same signs as those produced by the first lens unit, it is possible to obtain good balance with the aberrations produced by the third lens unit.

Now, description will be made on a driving mechanism for performing the fundamental movement of each of the lens units of the zoom lens system according to the present invention.

Figure 3:
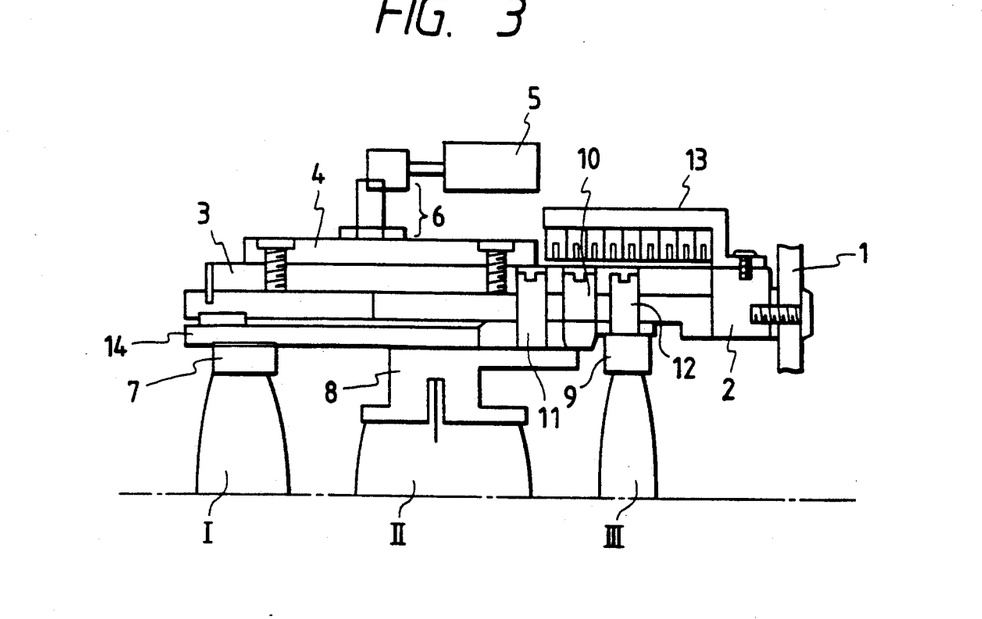
FIG. 3 shows a sectional view illustrating the conception of the lens barrel structure for the zoom lens system according to the present invention.
Figure 4:
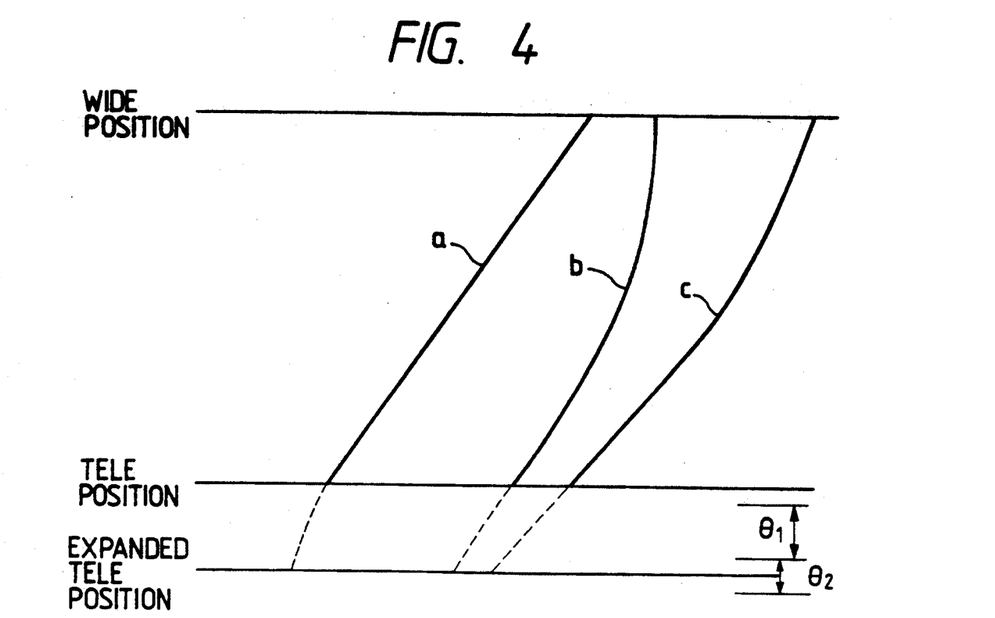
FIG. 4 shows a diagram illustrating shapes of the cam grooves used in the lens barrel structure shown in FIG. 3.

A sectional view illustrating the conception of a lens barrel structure for the zoom lens system lens system according to the present invention is shown in FIG. 3. In this drawing, the reference numeral 1 represents a camera body, the reference numeral 2 designates a frame fixed to the camera body, the reference numeral 3 denotes a cam ring arranged around the outside circumference of the fixed frame 2, and the reference numeral 4 represents an interlocked cam which is fixed to the cam ring 3 and driven by a zooming motor 5 by way of a gear train 6. The reference numeral 7 designates a lens frame for fixing the first lens unit I, the reference numeral 8 denotes a lens frame for fixing the second lens unit II and the reference numeral 9 represents a lens frame for fixing the third lens unit III. Further, the reference numerals 10, 11 and 12 designate rollers attached to the lens frames 7, 8 and 9 respectively, and the reference numeral 13 denotes a zooming encoder. The reference numeral 14 represents a movable frame. In addition, formed in the cam ring 3 are cam grooves a, b and c as shown in FIG. 4. The solid lines shown in FIG. 4 indicate the portions of the cam grooves which correspond to the ordinary vari-focal range from the wide position to the tele position. These cam grooves a, b and c are extended further from the tele position to the expanded tele position as indicated by the dashed lines, and the intervals of the cam grooves a, b, and c are selected so as to set the airspaces between the lens units at $D_{1T'}$ and $D_{2T'}$ at the expanded tele position.

In the lens barrel structure and the driving mechanism described above, the interlocked cam is turned by way of the gear train 6 and further the cam ring 3 is rotated by driving the motor 5. By the rotation of the cam ring 3, the first lens unit I, the second lens unit II and the third lens unit III are displaced as shown in FIG. 4. In the section 8 where the lens units are displaced as indicated by the dashed lines in FIG. 4, the zoom lens system is not used for photographing.

Under the driving by the zooming motor 5 described above, focal length of the zoom lens system is continuously varied in the range from the wide position to the tele position,, and to the focal length at the expanded tele position.

DETAILED DESCRIPTION OF THE PREFERRED EMBODIMENTS

Now, the present invention will be described more detailedly with reference to the preferred Embodiments shown in the accompanying drawings and given in the form of the following numerical data:

Embodiment 1

| $f = 39.5 \sim 102.7$ | | $F/4.65 \sim F/6.55$ | |
| $2\omega = 57.4° \sim 23.8°$ | | | |
| $f_{ET} = 124.2$ | | $F/7.94$ | |

| $r_1 = 115.2670$ | $d_1 = 1.4000$ | $n_1 = 1.83400$ | $\nu_1 = 37.16$ |
| $r_2 = 28.8331$ | $d_2 = 0.7100$ | | |
| $r_3 = 28.2651$ | $d_3 = 3.4000$ | $n_2 = 1.60300$ | $\nu_2 = 65.48$ |
| $r_4 = 102.8707$ | $d_4 = 0.2000$ | | |
| $r_5 = 29.0721$ | $d_5 = 3.8000$ | $n_3 = 1.55671$ | $\nu_3 = 58.68$ |
| $r_6 = -339.3697$ | $d_6 = D_1$ (variable) | | |
| $r_7 = -19.5695$ | $d_7 = 1.4000$ | $n_4 = 1.79500$ | $\nu_4 = 45.29$ |
| $r_8 = 33.4856$ | $d_8 = 0.5500$ | | |
| $r_9 = 32.5005$ | $d_9 = 2.5000$ | $n_5 = 1.78472$ | $\nu_5 = 25.68$ |
| $r_{10} = -70.3092$ | $d_{10} = 0.5000$ | | |
| $r_{11} = -97.0891$ | $d_{11} = 1.4000$ | $n_6 = 1.69100$ | $\nu_6 = 54.84$ |
| $r_{12} = -1305.1334$ | $d_{12} = 1.0000$ | | |
| $r_{13} = \infty$ (stop) | $d_{13} = 1.0000$ | | |
| $r_{14} = -133.7972$ | $d_{14} = 2.2500$ | $n_7 = 1.63636$ | $\nu_7 = 35.37$ |
| $r_{15} = -18.7647$ | $d_{15} = 0.2000$ | | |
| $r_{16} = 38.5688$ | $d_{16} = 2.5000$ | $n_8 = 1.62230$ | $\nu_8 = 53.20$ |
| $r_{17} = -44.5886$ | $d_{17} = 0.8500$ | | |
| $r_{18} = -16.5161$ | $d_{18} = 1.2500$ | $n_9 = 1.74000$ | $\nu_9 = 28.29$ |
| $r_{19} = 33.1126$ | $d_{19} = 0.2400$ | | |
| $r_{20} = 39.7549$ | $d_{20} = 3.2500$ | $n_{10} = 1.62299$ | $\nu_{10} = 58.14$ |
| $r_{21} = -16.5460$ | $d_{21} = D_2$ (variable) | | |
| $r_{22} = -23.9539$ | $d_{22} = 2.9500$ | $n_{11} = 1.78470$ | $\nu_{11} = 26.30$ |
| $r_{23} = -17.3716$ | $d_{23} = 0.8600$ | | |

-continued

Embodiment 1

| $r_{24} = -24.3055$ | $d_{24} = 1.3000$ | $n_{12} = 1.72916$ | $\nu_{12} = 54.68$ |
| $r_{25} = -33.1828$ | $d_{25} = 2.1000$ | | |
| $r_{26} = -18.2661$ | $d_{26} = 1.3000$ | $n_{13} = 1.72916$ | $\nu_{13} = 54.68$ |
| $r_{27} = -304.9233$ | | | |

| | W | S | T | ET |
|---|---|---|---|---|
| $D_1$ | 2.550 | 12.560 | 17.590 | 18.903 |
| $D_2$ | 18.850 | 9.830 | 2.820 | 0.694 |

$\beta_{3T} = 2.824$    $\beta_{3T}' = 3.348$

Embodiment 2

| $f = 39.3 \sim 132.6$ | | $F/4.5 \sim F/7.71$ | |
| $2\omega = 57.66° \sim 18.53°$ | | | |
| $f_{ET} = 145.0$ | | $F/11.30$ | |

| $r_1 = 5475.5289$ | $d_1 = 1.7200$ | $n_1 = 1.83400$ | $\nu_1 = 37.16$ |
| $r_2 = 50.6199$ | $d_2 = 1.2000$ | | |
| $r_3 = 79.7805$ | $d_3 = 3.6500$ | $n_2 = 1.64000$ | $\nu_2 = 60.09$ |
| $r_4 = 413.2292$ | $d_4 = 0.2000$ | | |
| $r_5 = 33.4990$ | $d_5 = 5.2500$ | $n_3 = 1.49700$ | $\nu_3 = 81.61$ |
| $r_6 = -110.0606$ | $d_6 = D_1$ (variable) | | |
| $r_7 = -32.0020$ | $d_7 = 1.6200$ | $n_4 = 1.84100$ | $\nu_4 = 43.23$ |
| $r_8 = 21.9789$ | $d_8 = 1.3080$ | | |
| $r_9 = 27.9975$ (aspherical surface) | $d_9 = 2.7200$ | $n_5 = 1.78472$ | $\nu_5 = 25.68$ |
| $r_{10} = -41.0641$ | $d_{10} = 2.0000$ | | |
| $r_{11} = -23.2209$ | $d_{11} = 1.8500$ | $n_6 = 1.70000$ | $\nu_6 = 48.08$ |
| $r_{12} = -30.0726$ | $d_{12} = 3.8500$ | | |
| $r_{13} = \infty$ (stop) | $d_{13} = 2.1500$ | | |
| $r_{14} = -232.0353$ | $d_{14} = 2.7500$ | $n_7 = 1.61800$ | $\nu_7 = 63.38$ |
| $r_{15} = -36.8408$ | $d_{15} = 0.3500$ | | |
| $r_{16} = 65.9953$ | $d_{16} = 3.2400$ | $n_8 = 1.60881$ | $\nu_8 = 58.94$ |
| $r_{17} = -28.2241$ | $d_{17} = 0.5850$ | | |
| $r_{18} = -24.1104$ | $d_{18} = 1.7500$ | $n_9 = 1.78470$ | $\nu_9 = 26.22$ |
| $r_{19} = 52.7043$ | $d_{19} = 0.8550$ | | |
| $r_{20} = 61.9805$ | $d_{20} = 4.0000$ | $n_{10} = 1.61720$ | $\nu_{10} = 54.04$ |
| $r_{21} = -22.1366$ (aspherical surface) | $d_{21} = D_2$ (variable) | | |
| $r_{22} = 193.4725$ | $d_{22} = 3.3500$ | $n_{11} = 1.78470$ | $\nu_{11} = 26.22$ |
| $r_{23} = -36.7360$ (aspherical surface) | $d_{23} = 0.9500$ | | |
| $r_{24} = -36.4680$ | $d_{24} = 1.4500$ | $n_{12} = 1.77250$ | $\nu_{12} = 49.66$ |
| $r_{25} = 40.3314$ | $d_{25} = 5.4500$ | | |
| $r_{26} = -26.1119$ | $d_{26} = 1.7500$ | $n_{13} = 1.73520$ | $\nu_{13} = 41.08$ |
| $r_{27} = -69.2496$ | | | | aspherical coefficient (9th surface)
$E = -0.16572 \times 10^{-5}$,    $F = -0.10996 \times 10^{-7}$
$G = 0.44878 \times 10^{-9}$,    $H = -0.34885 \times 10^{-11}$ (21th surface)
$E = 0.97261 \times 10^{-5}$,    $F = 0.19926 \times 10^{-7}$
$G = -0.36802 \times 10^{-9}$,    $H = 0.20193 \times 10^{-11}$ (23rd surface)
$E = -0.68780 \times 10^{-6}$,    $F = 0.99067 \times 10^{-8}$
$G = 0.69513 \times 10^{-10}$,    $H = -0.49493 \times 10^{-12}$

| | W | S | T | ET |
|---|---|---|---|---|
| $D_1$ | 2.090 | 14.802 | 18.166 | 18.577 |
| $D_2$ | 18.625 | 5.522 | 1.539 | 0.817 |

$\beta_{3T} = 3.8513$    $\beta_{3T}' = 4.192$ wherein the reference symbols $r_1, r_2, \ldots$ represent radii of curvature on the surfaces of the respective lens components, the reference symbols $d_1, d_2, \ldots$ designate thicknesses of the respective lens components and airspaces reserved therebetween, the reference symbols $n_1, n_2, \ldots$ denote refractive indices of the respective lens components, and the reference symbols $\nu_1, \nu_2, \ldots$ represent Abbe's numbers of the respective lens components.

Figure 5:
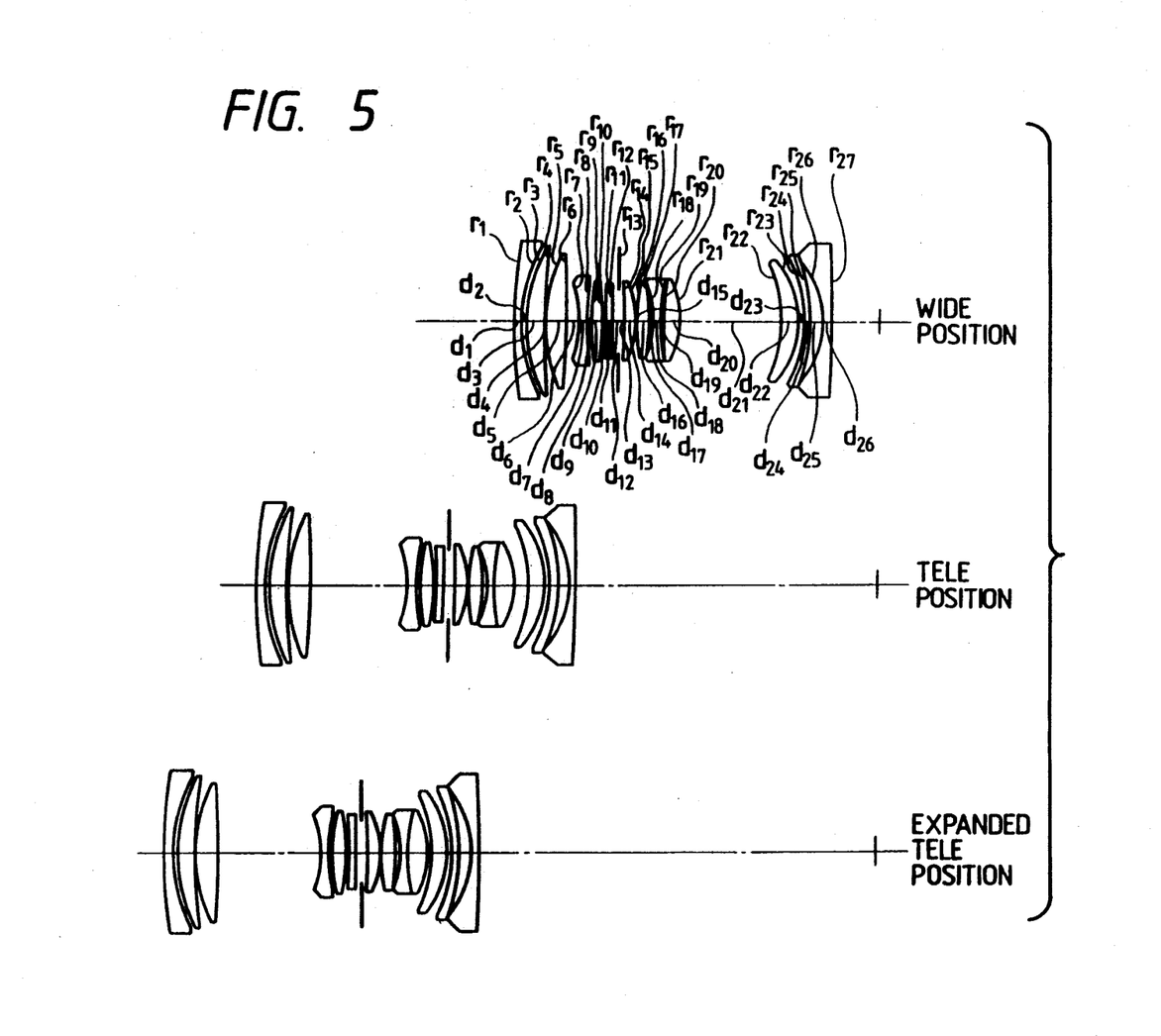
FIG. 5 and FIG. 6 show sectional views illustrating compositions of Embodiments 1 and 2 of the zoom lens system according to the present invention.

The Embodiment 1 has the composition illustrated in FIG. 5, is adapted so as to perform continuous zooming from the wide position to the tele position by varying the airspaces $D_1$ and $D_2$ as indicated in the numerical data, and can have a focal length $f_T = 124.2$ mm and a vari-focal ratio of 3.14 by varying the airspaces $D_1$ and at the values specified for ET (the expanded tele position).

That is, the zoom lens system according to the first embodiment of the present invention permits photography at continuously varying focal lengths ($f = 39.5$ to $f = 102.7$) within the ordinary zooming range that goes from the wide position to the tele position. Further, the first embodiment permits photographing at an additional focal length $f_T = 124.2$ (the focal length at the expanded position). This additional focal length is longer than and discontinuous from the focal length $f_T = 102.7$ at the tele position. Embodiment 1 of the present invention permits photography at focal lengths anywhere between the wide and the tele focal lengths as well as an additional focal length at an expanded position, the additional focal length being greater than the tele focal length and discontinuous therefrom.

Figure 7:
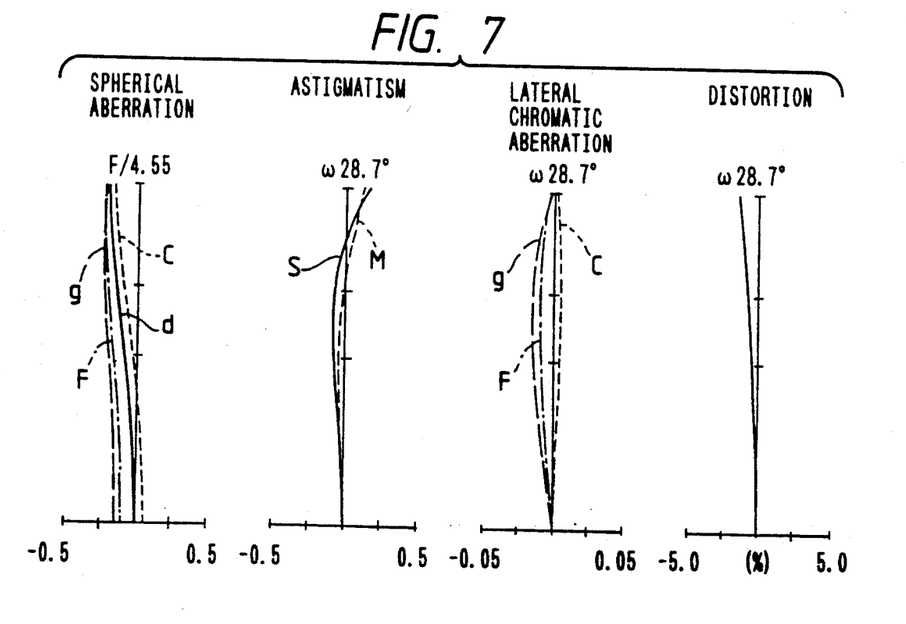
FIG. 7 through FIG. 10 show curves illustrating aberration characteristics of the Embodiment 1 of the present invention.
Figure 8:
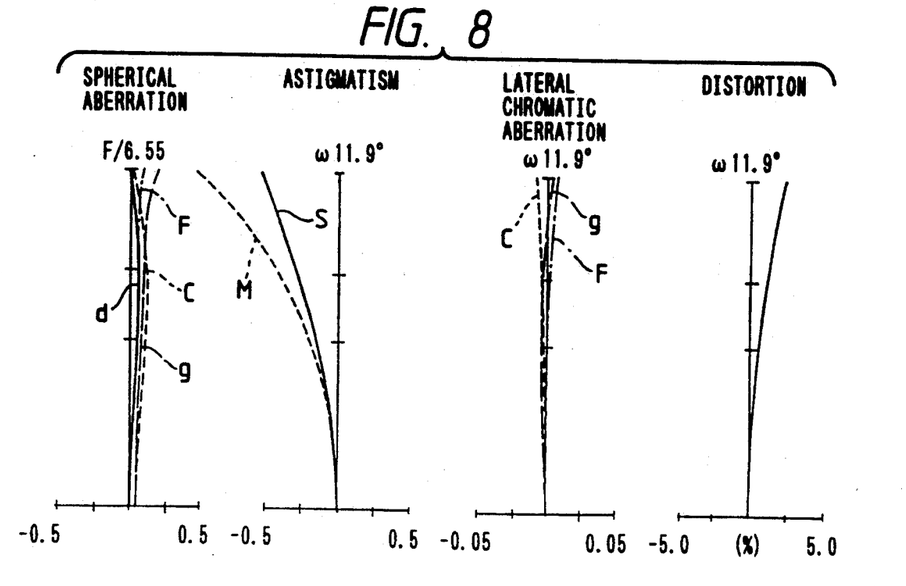
Figure 9:
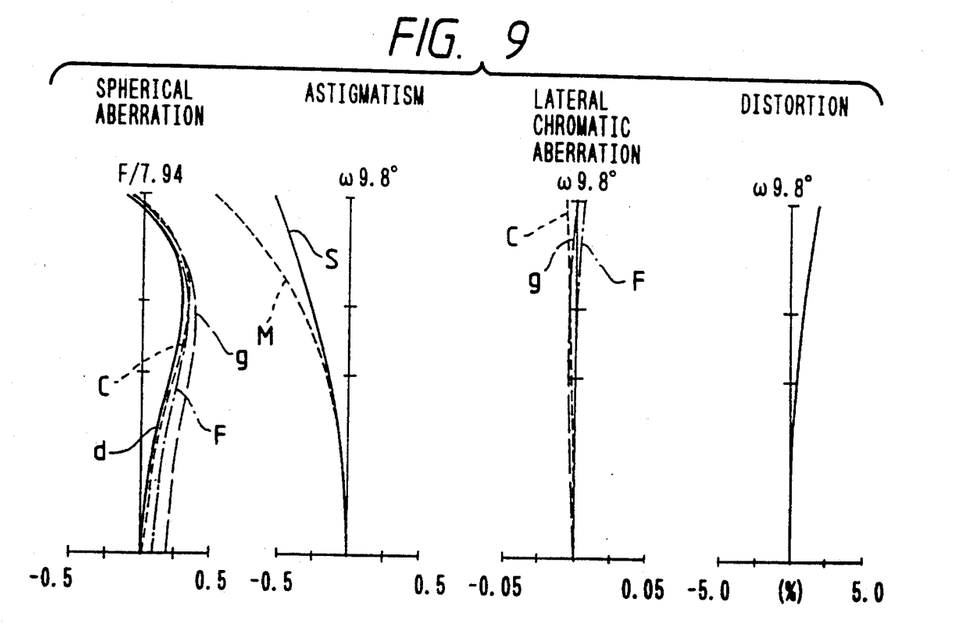

Aberration characteristics at the wide position, tele position and expanded tele position of the Embodiment 1 are illustrated in FIG. 7, FIG. 8 and FIG. 9 respectively. As is seen from these drawings, the Embodiment 1 has aberrations corrected sufficiently favorably even at the expanded tele position though spherical aberration is slightly varied at that position.

In addition, by selecting $D_1$ of 18.524 mm and $D_2$ of 1.228 mm at the expanded tele position for a zoom lens system having the same numerical data as those of the Embodiment 1, it is possible to obtain a zoom lens system according to the present invention which has $f_{ET}$ of 118.18 mm and a vari-focal ratio of 3. $\beta_{3ET}$ is 3.205 in this zoom lens system.

Figure 10:
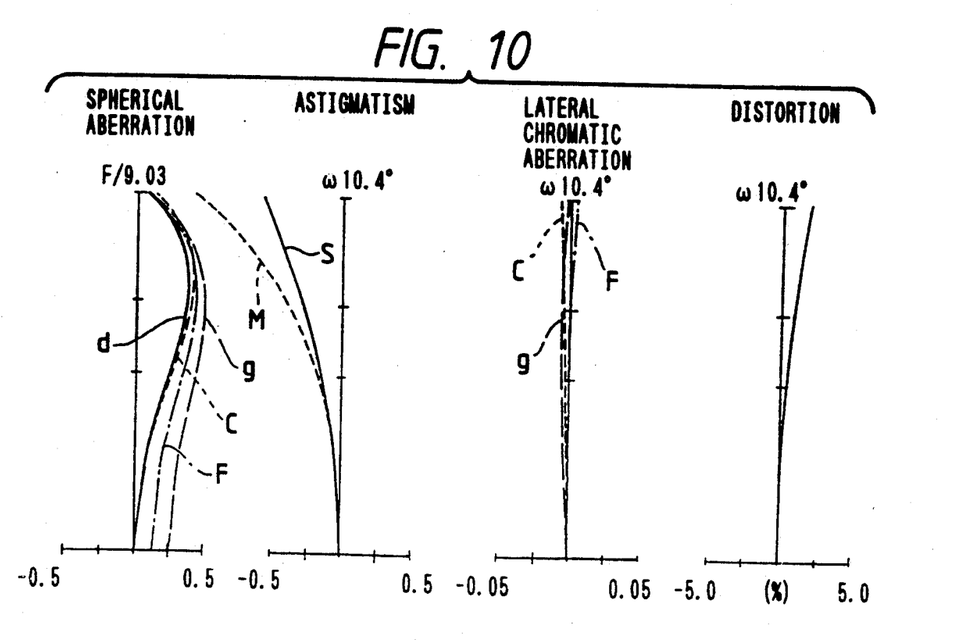
Figure 15:
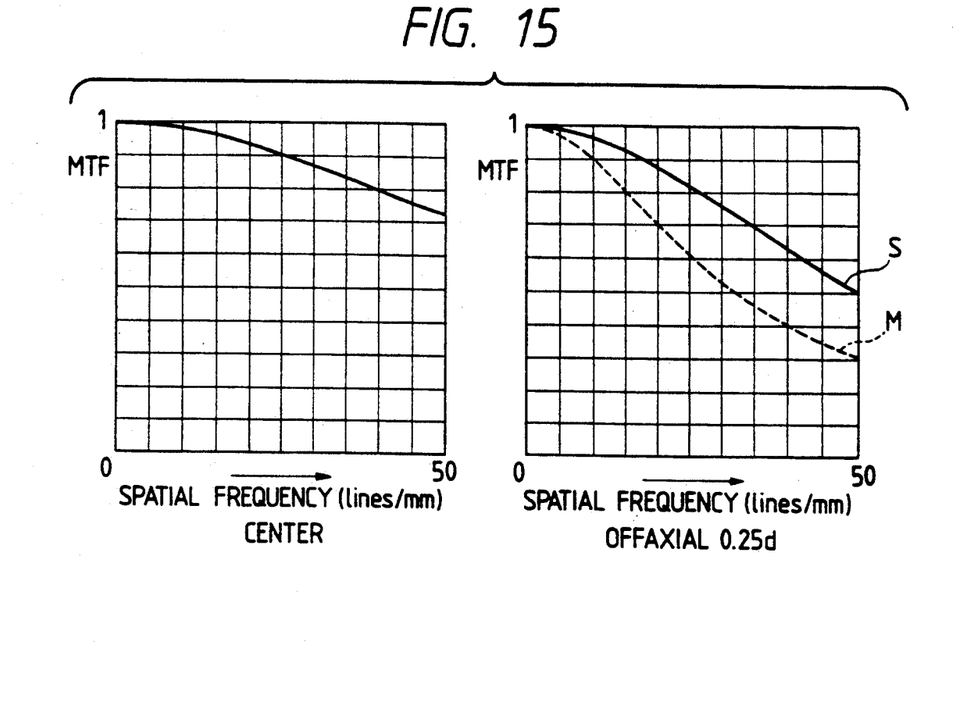
FIG. 15 and FIG. 16 show graphs illustrating modulation transfer functions of the Embodiments 1 and 2 respectively at the expanded tele positions thereof.

Aberration characteristics at the expanded tele position of this zoom lens system ($f_{ET} = 118.18$ mm) are illustrated in FIG. 10. FIG. 15 visualizes geometrical optical MTF's at the center of the image surface and at an offaxial point located 0.25d (the reference symbol d represents a diagonal length of film) as measured from the optical axis which are calculated at the best focus points for white light at the centers of images.

Figure 6:
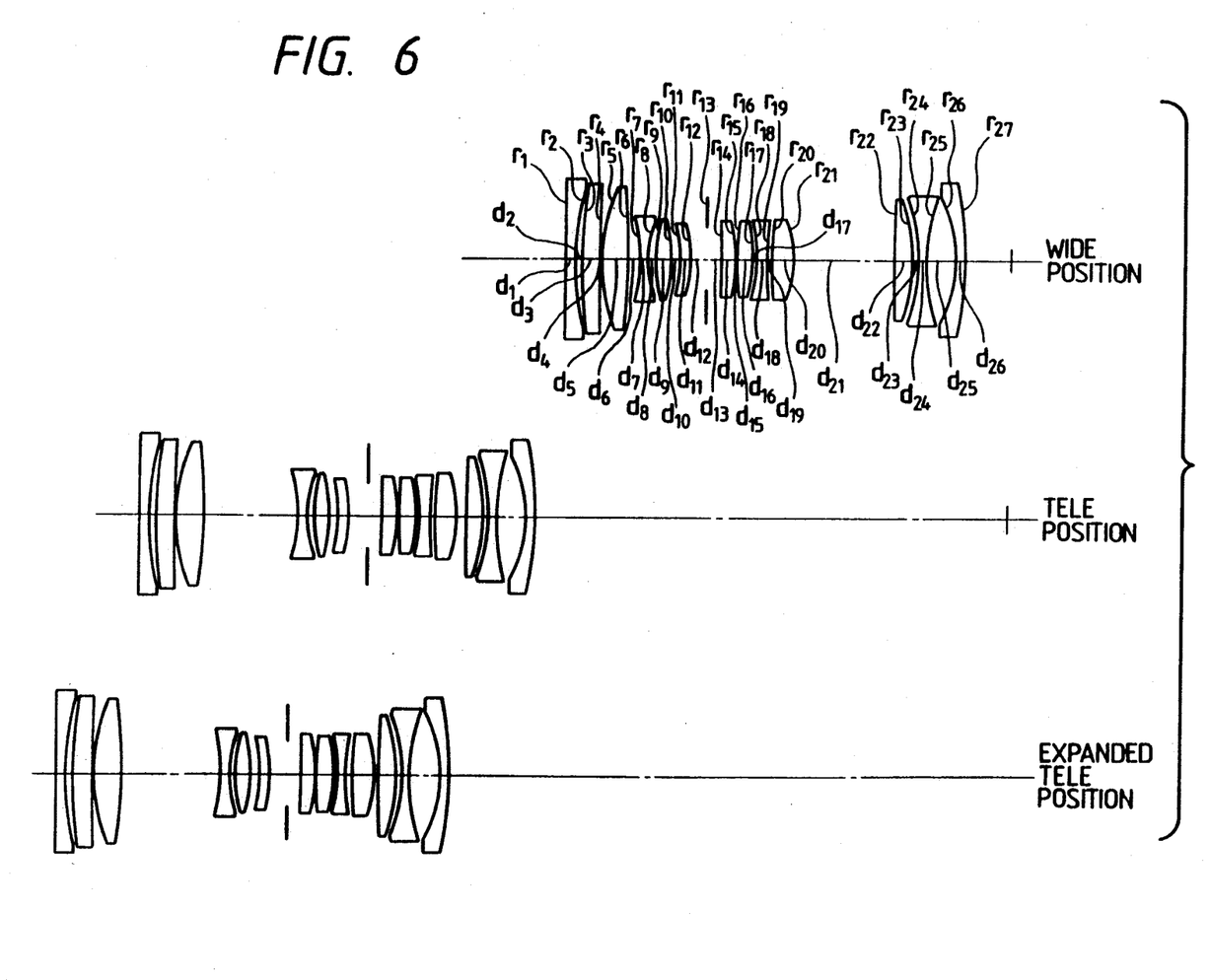

The Embodiment 2 has the composition illustrated in FIG. 6 and permits continuously varying focal length thereof in the ordinary manner within a range from $f = 39.3$ mm to 132.6 mm.

The Embodiment 2 is set at the expanded tele position thereof ($f_{ET} = 145.0$ mm) when $D_1$ and $D_2$ are set at 18.577 mm and 0.817 mm respectively, and permits telephotographing in the true sense of the term at a vari-focal ratio of 3.7.

Figure 11:
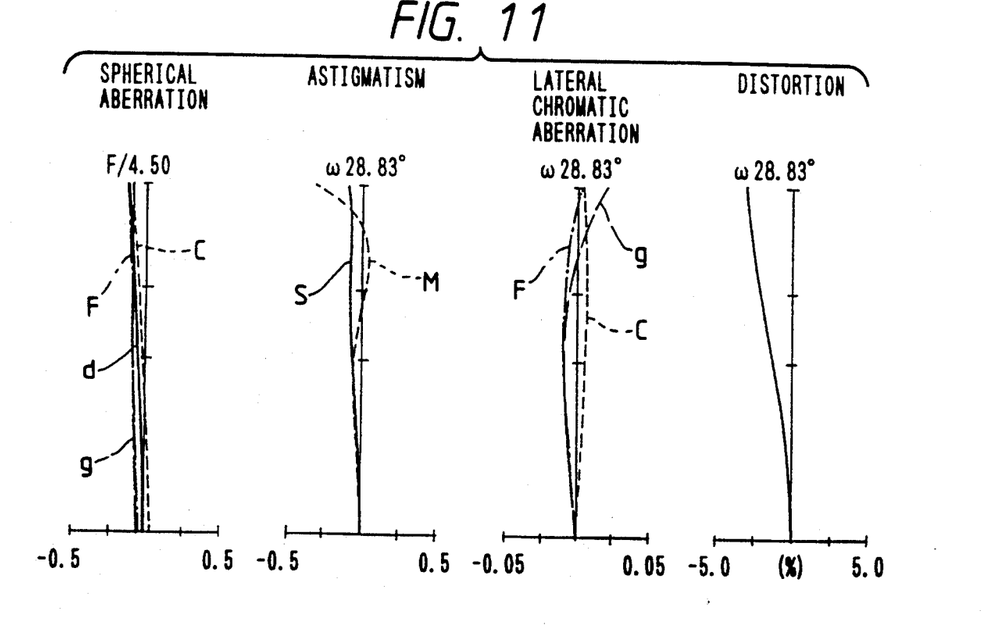
FIG. 11 through FIG. 14 show graphs illustrating aberration characteristics of the Embodiment 2 of the present invention.
Figure 12:
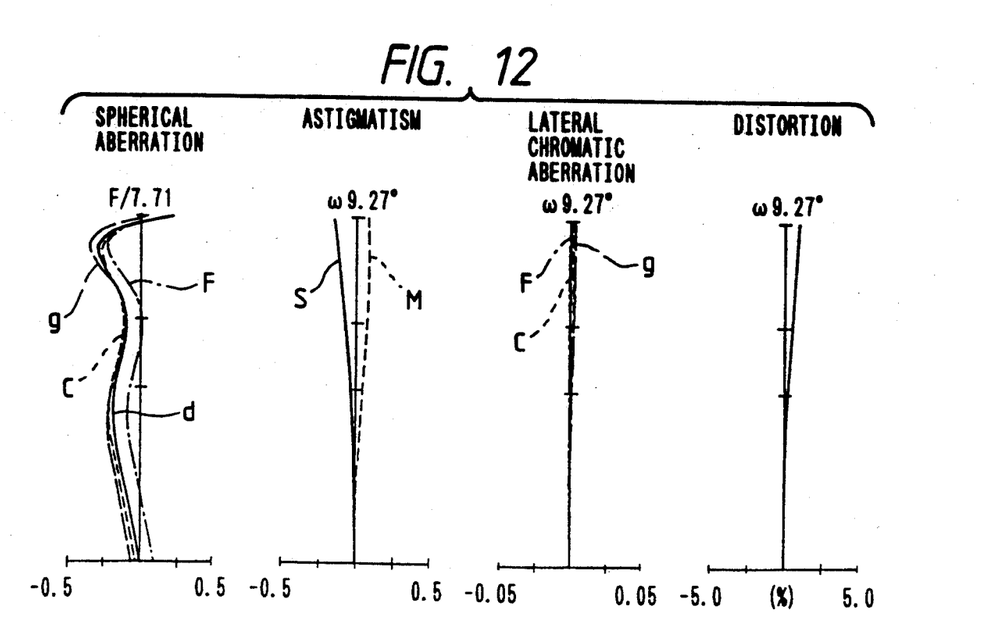
Figure 13:
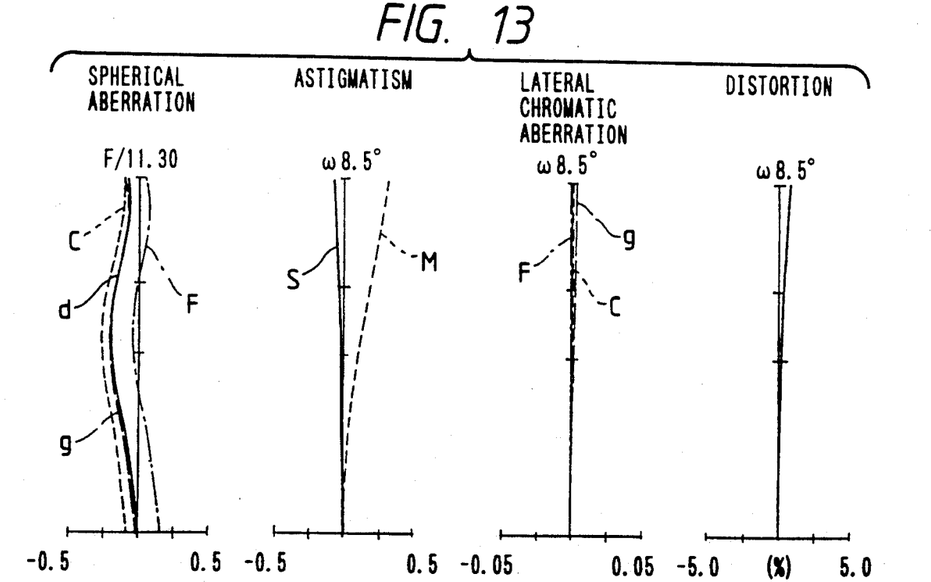
Figure 16:
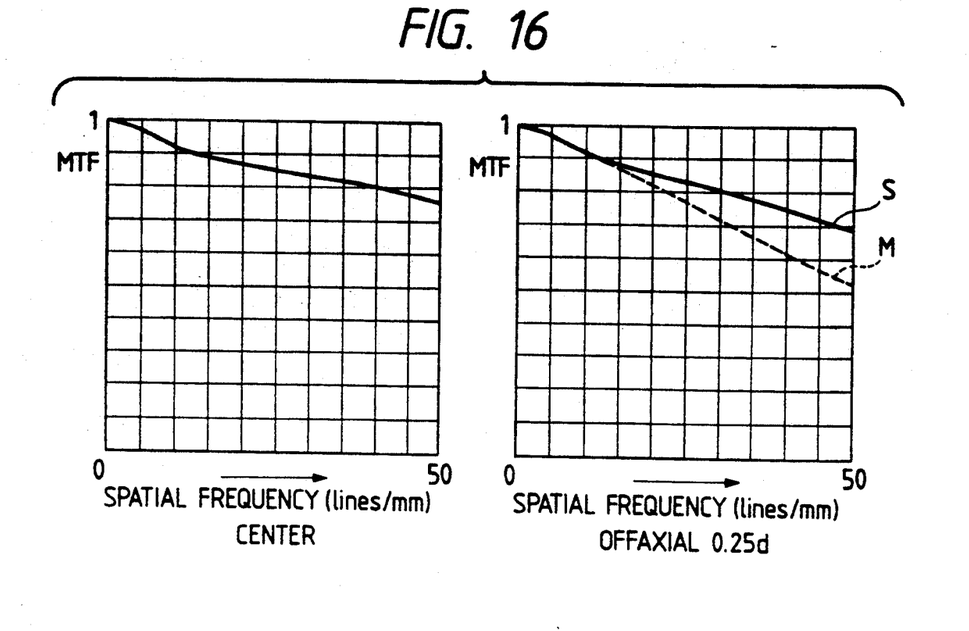

Aberration characteristics at the wide position, tele position and expanded tele position of the Embodiment 2 are visualized in FIG. 11 FIG. 12 and FIG. 13 respectively. FIG. 16 illustrates geometrical optical MTF's at the center of the image surface and an offaxial point located 0.25d as measured from the optical axis which are calculated at the best contrast.

Figure 14:
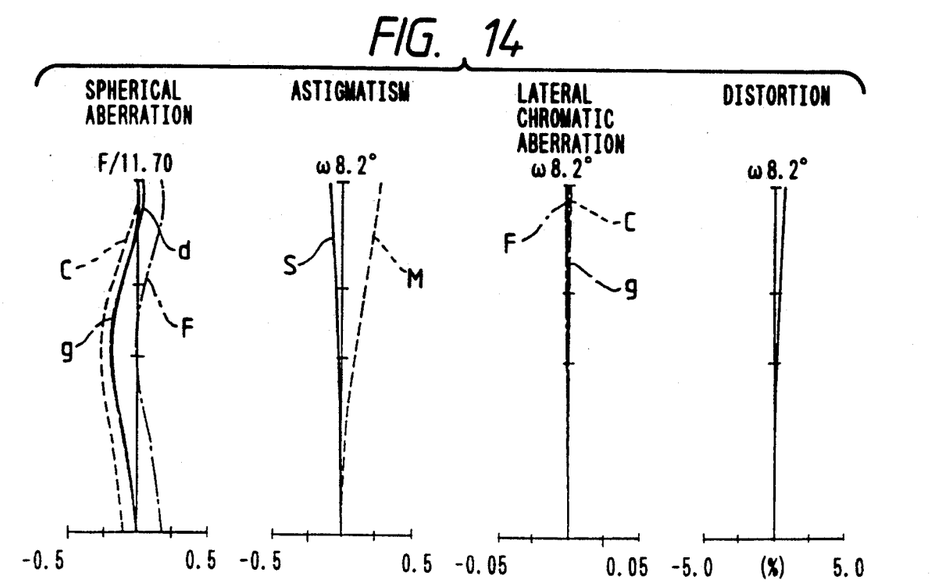

FIG. 14 shows aberration characteristics at the expanded tele position of a zoom lens system which has the same numerical data as those of the Embodiment 2 but modified airspaces of $D_1 = 18.704$ mm and $D_2 = 0.5668$ mm at the expanded tele position. The modified embodiment 2 has an F number of 11.9 in a condition where the stop thereof is kept open, an aperture ratio a little smaller than that of the Embodiment 2, a focal length longer than that of the Embodiment 2, and is a zoom lens system excellent for practical use.

For designing each of the Embodiments 1 and 2 which have the expanded tele positions as described above, it is necessary to reserve a rather wide airspace between the second lens unit and the third lens unit, and allow total length of the lens system to be slightly prolonged at the wide position. However, the problem of the prolonging of the total length can be solved by adopting the collapsible mount type lens barrel.

Further, it is necessary to design the zoom lens system so as to have sufficiently favorable performance at the tele position thereof since remarkable variation of spherical aberration is undesirable for practical use. Furthermore, the embodiments described above have the offaxial aberrations when the lens systems are focused on an object located at infinite distance, but must be designed so as to allow aberrations to be varied little by focusing.

From the mechanical viewpoint, the embodiments require consideration to prevent the second lens unit and the third lens unit from being interfered with each other at the expanded tele position. Moreover, when the lens units including the first lens unit are moved for long distances for varying focal length, it will be necessary to separate the movable frame from the lens frame as shown in FIG. 3.

In order to correct aberrations favorably at the expanded tele position, it will be effective to vary, on the optical axis, the airspaces reserved between the lens components arranged in each lens unit.

According to the present invention, it is possible to obtain a zoom lens system which permits photographing at an expanded tele position (without using an attachment lens in addition to the photographing within the ordinary vari-focal range wherein focal length of the zoom lens system can be varied continuously. Accordingly, the present invention makes it possible to easily integrate a zoom lens system with a camera body. The zoom lens system according to the present invention has favorable optical performance and is compatible with a lens barrel which can easily be manufactured by extending the cam grooves in the lens barrel for the ordinary zoom lens system.

I claim:

1. A zoom lens system comprising, in order from the object side:
   a first lens unit having a positive refractive power;
   a second lens unit having a positive refractive power; and
   a third lens unit having a negative refractive power;
   wherein said zoom lens system performs zooming from a wide position to a tele position by varying airspaces reserved between the first, second and third lens units; and
   wherein said zoom lens system includes an additional vari-focal function that permits obtaining at least one focal length longer than the focal length of the zoom lens system as a whole at the tele position and a lateral magnification higher than the magnification at the tele position by setting the airspace between the second unit and third lens unit so that said airspace is smaller than at the tele position, said vari-focal function corresponding to a position exceeding the tele position.

2. A zoom lens system according to claim 1, wherein the airspace between the first lens unit and the second lens unit is wider at the position exceeding the tele position that at the tele position.

3. A zoom lens system comprising, in order from the object side:
 a first lens unit having a positive refractive power;
 a second lens unit having a positive refractive power; and
 a third lens unit having a negative refractive power;
 wherein said zoom lens system performs zooming, thus permitting continuous variation of at least one of lateral magnification and focal length from a wide position to a tele position, the variation being caused by varying airspaces reserved between said first, second and third lens units; and
 wherein said zoom lens system includes an additional vari-focal function that permits obtaining at least one focal length longer than the focal length of the zoom lens system as a whole at the tele position and a lateral magnification higher than the magnification at the tele position, said vari-focal function corresponding to a position exceeding the tele position.

4. A zoom lens system according to claim 3, wherein the airspace between the first lens unit and the second lens unit is wider at the position exceeding the tele position than at the tele position.

* * * * *